(12) United States Patent
Sakata et al.

(10) Patent No.: US 6,897,380 B2
(45) Date of Patent: May 24, 2005

(54) GROMMET FOR A WIRE HARNESS

(75) Inventors: Tsutomu Sakata, Yokkaichi (JP); Yoshimi Uchida, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/721,356

(22) Filed: Nov. 26, 2003

(65) Prior Publication Data

US 2004/0154819 A1 Aug. 12, 2004

(30) Foreign Application Priority Data

| Nov. 29, 2002 | (JP) | 2002-348718 |
| Nov. 29, 2002 | (JP) | 2002-348770 |
| Nov. 29, 2002 | (JP) | 2002-348806 |
| Nov. 29, 2002 | (JP) | 2002-348857 |
| Nov. 29, 2002 | (JP) | 2002-348887 |

(51) Int. Cl.$^7$ ............................................. H02G 13/00
(52) U.S. Cl. ................. 174/65 G; 174/152 G; 174/153 G; 174/65 SS; 174/64; 174/65 R; 174/11 BH; 174/14 BH; 174/151; 174/135; 248/56; 16/2.1; 16/2.2; 439/604; 439/587; 277/606
(58) Field of Search ................ 174/65 G, 152 G, 174/153 G, 65 SS, 64, 65 R, 11 BH, 14 BH, 151, 135; 248/56; 16/2.1, 2.2; 439/604, 587; 277/606

(56) References Cited

U.S. PATENT DOCUMENTS

| 3,584,888 A | * | 6/1971 | Lott | 277/589 |
| 4,901,398 A | * | 2/1990 | Durand | 452/157 |
| 6,058,562 A | | 5/2000 | Satou et al. | 16/2.1 |
| 6,240,597 B1 | * | 6/2001 | Mochizuki | 16/2.1 |
| 6,495,767 B2 | | 12/2002 | Okuhara et al. | 174/152 G |
| 6,525,269 B2 | * | 2/2003 | Sato | 174/65 G |
| 6,603,078 B2 | | 8/2003 | Okuhara et al. | 174/153 G |

FOREIGN PATENT DOCUMENTS

| EP | 0822121 | 2/1998 |
| EP | 0888931 | 1/1999 |
| EP | 1190914 | 3/2002 |
| FR | 2826091 | 12/2002 |
| JP | 8-212856 | 8/1996 |
| JP | 2002-171645 | 6/2002 |

OTHER PUBLICATIONS

English Language Abstract of JP 8–212858.

* cited by examiner

Primary Examiner—Dean A. Reichard
Assistant Examiner—Anton Harris
(74) Attorney, Agent, or Firm—Greenblum & Bernstein P.L.C.

(57) ABSTRACT

The grommet having a longitudinal axis includes a funnel shaped portion having a flared end, a narrowed end and a conical wall with external and internal conical faces. The external conical face includes an external circular groove having a groove base. The grommet further includes a tubular portion extending outwardly from a circular joint section formed at the narrowed end of the funnel shaped portion. The grommet is configured to mount a wire harness for vehicles containing a water-trapping zone, and to be installed into a through-hole formed in a body panel of a vehicle. The funnel-shaped portion includes at least one device for improving the flexibility of and/or space availability for the wire harness to be mounted including an extended tubular portion to hold the water-trapping zone of the wire harness, a structural configuration allowing the length along the longitudinal axis of the funnel shaped portion to be reduced such that the wire harness can be wired substantially alongside the body panel, and a plurality of funnel ribs having closely arranged first end sections that form a circular space around the tubular portion.

31 Claims, 14 Drawing Sheets

PRIOR ART

PRIOR ART

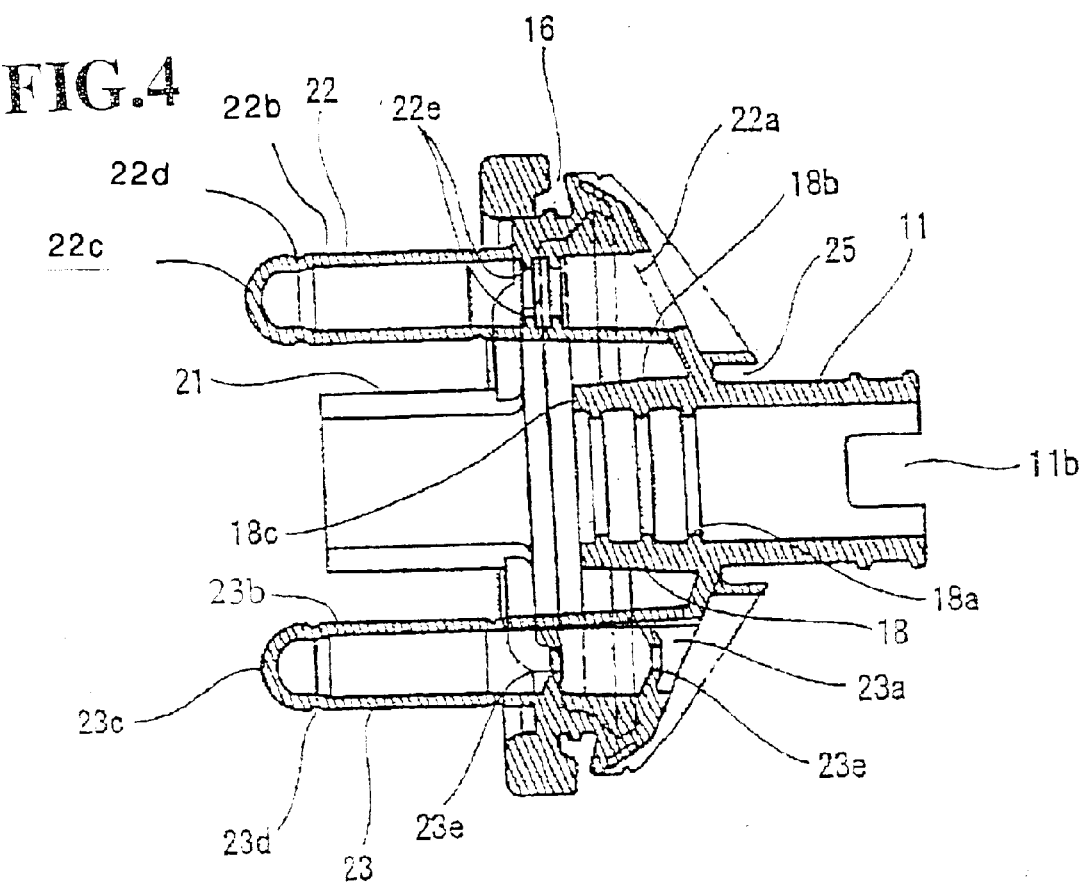

GROMMET FOR A WIRE HARNESS

BACKGROUND OF THE INVENTION

1. Field of the Invention

The present invention relates to a grommet, in particular for mounting on a wire harness fitted in vehicles such as automobiles. More particularly, the invention relates to a "one-motion grommet" (or "one-way grommet"), which is installed by insertion into a through-hole of a vehicle body panel. The grommet of the present invention provides mechanical protection, as well as water and dust protection, for the wire harness at the insertion point of the through-hole.

2. Description of Background Information

It is already known to install a grommet on the wire harness leading from the engine compartment to the passenger compartment of an automobile. Such a grommet is mounted around the through-hole of the car-body panel/bulkhead. The car-body panel/bulkhead separates the passenger compartment from the engine compartment of an automobile. The grommet protects the wire harness passing through the through-hole and provides protection from water and dust, as well as sound insulation between the engine compartment and the passenger compartment.

Several grommets of this type have already been proposed. An example of such a grommet is described in Japanese Patent Application JP-A-2002-171645 filed by the present Applicant and shown in FIGS. 1A and 1B of the present application. The grommet 1 shown in FIG. 1A includes a tubular portion 2 having a gradually widening diameter (referred to as "funnel-shaped portion 2") and a tubular portion 3 linked to the small-diameter end part of the funnel-shaped portion 2. A press-fit groove portion 4 is provided in the larger-diameter end part of the funnel-shaped portion 2. This press-fit groove portion is used for fixing the grommet in the car-body panel. The press-fit groove portion 4 includes a groove 4a. The groove 4a is defined by a vertical wall 4b (i.e. whose face is in a radial cross-sectional plane of the grommet) disposed at the side of the groove closest to the large-diameter end part, and an inclined wall 4c (the inclination being relative to the aforementioned radial cross-sectional plane of the grommet) disposed at the side of the groove closest to the small-diameter end part of the funnel-shaped portion 2. A plurality of rib portions 2a is provided on the external conical face of the funnel-shaped portion 2. These rib portions 2a extend from the top of the inclined wall 4c substantially to the part of the funnel-shaped portion 2 where the latter joins to the tubular portion 3. The wire harness W/H passes through the tubular portion 3 into the space inside the funnel-shaped portion 2. The wire harness W/H is then fixed by a tape T at the end section of the tubular portion 3.

The grommet 1 is also provided integrally with two auxiliary tubes (only one is shown in FIG. 1A, at the left-hand part just above wire harness). Each auxiliary tube has a first end led out through a respective cavity (not shown in the figure) formed between two ribs 2a, a section which pass through the inside of the funnel-shaped portion 2, and a second end which extends beyond the flared end. One of the auxiliary tubes is used for passing a washer hose and the other for passing a hood (bonnet) wire. The tips of the auxiliary tubes are initially closed, and they are cut off when the hose or cable is passed through.

The operation for installing the grommet into the through-hole H of the car-body panel is as follows. The tubular portion 3 of the grommet 1 is inserted into the through-hole H from the engine compartment side. When the funnel-shaped portion 2 abuts against the internal circular face of the through-hole H, the grommet 1 is pushed forcibly. The funnel-shaped portion 2 is thereby deformed until it is squeezed into the through-hole and passed therethrough. After passing the through-hole, the grommet recovers its shape. Accordingly, the inclined wall 4c and the vertical wall 4b are tightly adjusted on either side of the car-body panel P. The press-fit groove portion 4 of the grommet 1 is in this way installed in the through-hole H of the car-body panel P. During this operation, referred to as "one-motion operation", only the rib portions 2a come into contact with the internal circular edge of the through-hole H. The contact surface is thus reduced compared to the case where the whole external face of the funnel-shaped portion 2 contacts the internal circular edge of the through-hole H. Consequently, the insertion resistance is lowered and operability is improved. Further, when the wire harness, installed in the through-hole H, is pulled towards the engine compartment, the free end portions of the rib portions 2a are pressed against the external face of the tubular portion 3. Movements of the tubular portion 3 are thus restrained. The press-fit groove portion 4 of the grommet 1 is then prevented from exiting out of the through-hole H. The fixing force of the grommet 1 is thus improved.

The one-motion grommet 1 shown in FIGS. 1A and 1B features good operability for installation into the through-hole of the car-body panel. At the same time, this grommet has the advantage of providing a high fixing force once installed in the through-hole. However, a wire harness sometimes has to include a water-trapping portion A in which the bundle of electrical cables constituting the wire harness is bound with a water-trapping agent 5. In such case, the grommets 1 of the prior art still have distinctive drawbacks.

For instance, when the above-mentioned water-trapping portion A is provided, it is enclosed in the tubular portion 3 and exerts an enlarging force on the latter. However, as the water-trapping agent 5 fills the space between the electrical cables W and then hardens, the tubular portion 3 loses its flexibility. Consequently, when the wire harness W/H extending from the tubular portion 3 is wired inside the passenger compartment and has to be bent, the harness portion contained in the tubular portion 3 cannot be used for that purpose. A specific space for disposing the tubular portion 3 has therefore to be envisaged in the passenger compartment.

Further, when the part of the funnel-shaped portion 2 projecting in the passenger compartment is long, a special space for the grommet is needed.

However, as the number of parts placed in a vehicle has increased greatly in recent years, there is little room for loading supplementary parts. Moreover, the wire harness passed through the body panel must often be wired by flexing, while the above part projecting in the passenger compartment has a long projection. Accordingly, when the wire harness is to be wired alongside a body panel, it needs a large space for making a loop.

Typically, when the wire harness exiting from the grommet is turned at a sharp angle, deformations are caused in the funnel-shaped portion installed in the through-hole, and the peripheral rim of that portion drifts away from the groove base lip, thereby breaking the sealing and allowing water penetration.

The grommet of the prior art may include one or more auxiliary tubes for a hood wire or cable, a washer hose or the like. These auxiliary tubes are typically slender and thus prone to bending, making it difficult to pass the washer hose or hood wire through these tubes. Even when the hose and/or wire is passed through, the auxiliary tubes are not sufficiently rigid to hold them straight. When an auxiliary tube is bent, water flow, for instance, can be blocked.

SUMMARY OF THE INVENTION

A purpose of the present invention is to provide a grommet that can be installed easily on a wire harness already provided with a water-trapping zone between its electrical cables. Another object of the invention is to improve the flexibility of the wire harness exiting from the grommet and to provide better wiring availability. A further object is to confer adequate strength to the auxiliary tubes, which may be incorporated in the grommet.

According to the present invention, the above problems can be solved by providing, in the grommet, at least one device for improving the flexibility and/or space availability for wiring, chosen from the group consisting of an extended tubular portion, a specific structural configuration and a circular space defined between the funnel ribs and the tubular portion.

Optionally, as a preferred aspect of the invention, the above problems are solved by providing an extended tubular portion inside the funnel-shaped portion. This extended tubular portion contains the water-trapping zone, freeing thus the tubular portion from this zone.

As another preferred aspect of the invention, the length of the funnel-shaped portion is shortened, so that the part of funnel-shaped portion projecting from the body panel is reduced and the wiring availability is thus improved.

As yet another preferred aspect of the invention, the circular space formed between the funnel ribs and the tubular portion allows the sealing with the grommet to be kept substantially intact, even if the wire harness is flexed at an acute angle.

Further, there may be provided a grommet that can prevent the bending of an auxiliary tube through which a hood wire or washer hose is passed, and improve the hose-or wire-passing operation.

An aspect of the present invention provides a grommet for mounting a vehicle wire harness which includes a water trapping zone, the grommet including: a longitudinal axis; a funnel shaped portion extending along the longitudinal axis and a tubular portion joined thereto by a circular joint section; the funnel shaped portion having a generally conical wall with external and internal generally conical faces and a flared end, the external generally conical face including a plurality of funnel ribs and an external circular groove with a groove base; wherein the external circular groove is engageable with a through-hole formed in a body panel of a vehicle; and wherein the funnel shaped portion includes a device to improve flexibility of and/or space availability for the wire harness when mounted, including one of: an extended tubular portion configured to hold the water trapping zone of the wire harness; a structural configuration allowing the length of the grommet along the longitudinal axis of the funnel shaped portion to be reduced, such that the wire harness can be wired substantially alongside the body panel; and a circular space between the plurality of funnel ribs near the circular joint section and the tubular portion.

In a further aspect of the present invention, the extended tubular portion extends from the circular joint section toward the inside of the funnel shaped portion. Further, the extended tubular portion may include a cylindrical wall and an end section distal from the circular joint section, and wherein the thickness of the cylindrical wall of the extended tubular portion increases from the end section to the circular joint section. Additionally, the tubular portion and the extended tubular portion may have an internal diameter smaller than the external diameter of the wire harness to be mounted. The extended tubular portion may have an external cylindrical face which includes anti-tear-off ribs extending along the longitudinal direction thereof and joined to the conical wall of the funnel-shaped portion.

In a further aspect of the present invention, the structural configuration has a length along the longitudinal axis from the groove base of the funnel shaped portion to the circular joint section thereof, and a diameter D in a plane normal to the longitudinal axis and including the groove base, and wherein the ratio of L:D is in the range of approximately 1:5 to 1:3. Further, the ratio L:D may be approximately 1:4.

A further aspect of the present invention that the plurality of funnel ribs have first end sections adjacent the circular joint section and second end sections, and radiate in multiple directions from the first end sections on the external conical face of the funnel-shaped portion, and wherein the first end sections form a circular space around the tubular portion, such that the tubular portion can be flexed independently from the plurality of funnel ribs. Further, the circular joint section may include a circular recess formed on a portion of the internal conical face of the funnel shaped portion which is opposed to the circular space. Further, the first end sections may have a radial projection greater than a radial projection of the second end sections, and the first end sections, when viewed in a longitudinal sectional plane, extend substantially parallel to the longitudinal axis along the tubular portion. Additionally, the flared end of the funnel shaped portion includes a closing face that includes a harness receiving aperture, from the rim of which a second tubular portion protrudes outwardly. The second tubular portion may be formed of two arched channels which extend from the closing face adjacent the harness receiving aperture.

In a further aspect of the present invention, the funnel-shaped portion contains at least one auxiliary tube extending along a line parallel to the longitudinal axis, and wherein a first end of the at least one auxiliary tube extends out through the conical wall of the funnel shaped portion, while a second end of the at least one auxiliary tube extends beyond the flared end of the funnel shaped portion. Further, the at least one auxiliary tube includes a reinforcing device. The at least one auxiliary tube includes an external circular face, and the reinforcing device includes at least one elongate link binding the external circular face of the at least one auxiliary tube to the conical wall of the funnel shaped portion. Additionally, wherein the at least one auxiliary tube includes an external circular face, and the reinforcing device includes at least one longitudinal rib extending along a line spaced from the at least one elongate link. The at least one auxiliary tube includes an internal circular face, and the reinforcing device includes at least one circular rib provided thereon. Further, the at least one auxiliary tube includes a first auxiliary tube configured to receive a washer hose and a second auxiliary tube configured to receive a hood wire; and the flared end of the funnel shaped portion includes a closing face that includes a first auxiliary aperture, a harness-receiving aperture and a second auxiliary aperture that are centrally aligned substantially along a common diameter line of the closing face and arranged in that order along the diameter line, and communicate with each other through an open passage, and wherein a second tubular portion extends outwardly from the rim of the harness-receiving aperture and the at least one auxiliary tube protrudes outwardly through the corresponding first and second auxiliary apertures.

In a further aspect of the present invention, the external circular groove defines a first groove wall section substantially in a plane normal to the longitudinal axis of the grommet, located at a groove side nearest to the flared end, and a second groove wall section inclined towards the flared end, located at a groove side closest to the narrowed end, whereby the funnel shaped portion is caused to be squeezed around the inclined wall when the grommet is passed through the through-hole. The plurality of funnel ribs may have first end sections adjacent the circular joint section and second end sections adjacent the second groove wall section, and radiate in multiple directions from the first end sections to the second end sections on the external conical face of the funnel shaped portion, and the funnel ribs include an outermost face having a radial projection which decreases substantially from the first end section to the second end section. Additionally, the funnel ribs have an outermost face which subtends a first angle $\theta 1$ relative to the longitudinal axis, from the first end section of the funnel ribs to a first mark where the grommet comes into contact with the peripheral rim of the through-hole when it is mounted, and the outermost face subtends a second angle $\theta 2$ which is smaller than the first angle $\theta 1$, from the first mark to a second mark where the outermost face substantially extends to the level of the radial distance, perpendicular to the longitudinal axis, of the second groove wall section. Further, the outermost face extends substantially parallel to the longitudinal axis from the second mark to the second end portion of the funnel ribs; and the funnel shaped portion includes a peripheral notch adjacent the second mark.

A further aspect of the present invention provides a wiring system including a grommet configured for mounting a vehicle wire harness which contains a water-trapping zone; the grommet including a longitudinal axis; a funnel shaped portion and a tubular portion joined thereto by a circular joint section; the funnel shaped portion having a generally conical wall with external and internal generally conical faces and a flared end, the external generally conical face including a plurality of funnel ribs and an external circular groove with a groove base; wherein the external circular groove is engageable with a through-hole formed in a body panel of a vehicle; and wherein the funnel shaped portion includes a device to improve flexibility of and/or space availability for the wire harness when mounted, including one of an extended tubular portion configured to hold the water trapping zone of the wire harness; a structural configuration allowing the length of the grommet along the longitudinal axis of the funnel shaped portion to be reduced, such that the wire harness can be wired substantially alongside the body panel; and a circular space between the plurality of funnel ribs near the circular joint section and the tubular portion; wherein the body panel is positioned between an engine compartment and a passenger compartment, the tubular portion of the grommet containing a wire harness is inserted from the engine compartment to the passenger compartment through the through-hole and the through-hole is fitted with the external circular groove, whereby the tubular portion extends inside the passenger compartment and can be bent together with the wire harness.

In a further aspect of the present invention, the extended tubular portion extends from the circular joint section toward the inside of the funnel shaped portion. Further, the structural configuration has a length along the longitudinal axis from the groove base of the funnel shaped portion to the narrowed end thereof, and a diametrical distance in the plane normal to the longitudinal axis including the groove base, and the ratio of L:D is in the range of approximately 1:5 to 1:3. The plurality of funnel ribs may have first end sections adjacent the circular joint section and second end sections and radiate in multiple directions from the first end sections on the external conical face of the funnel shaped portion, and wherein the first end sections form a circular space around the tubular portion, such that the tubular portion can be flexed independently from the plurality of funnel ribs. Additionally, the flared end of the funnel shaped portion may include a closing face that includes a harness receiving aperture from the rim of which a second tubular portion extends outwardly. Further, the funnel shaped portion may include at least one auxiliary tube extending along an axis parallel to the longitudinally axis, and a first end of the at least one auxiliary tube extends out through the conical wall of the funnel shaped portion, while a second end of the at least one auxiliary tube extends beyond the flared end of the funnel shaped portion. The external circular groove defines a first groove wall section substantially in a plane normal to the longitudinal axis of the grommet, located at a groove side nearest to the flared end, and a second groove wall section inclined toward the flared end, located at a groove side closest to the narrowed end, whereby the funnel shaped portion is caused to be squeezed around the inclined wall when the grommet is passed through the through-hole.

Optionally, an extension of the tubular portion, provided inside the funnel-shaped portion as an extension of the first tubular portion, can contain a water-trapping zone of the wire harness, in which the electrical cables contained in a wire harness are bound to one another.

In this manner, the water-trapping zone, in which water-trapping agents are solidified by absorbing water, stays inside the grommet. Hence, the first tubular portion projecting from the funnel-shaped portion can be folded easily, together with the wire harness.

In other words, the water-trapping zone is no longer contained in the first tubular portion that must be flexed with the wire harness when wired in the passenger compartment. By virtue of this configuration, wiring can be performed more freely.

Further, the thickness of the cylindrical wall of the tubular extension can increase from its tip end going towards the first tubular portion, so that the harness-holding force of the tubular extension also increases in the same direction. As a result, the water-trapping zone in the tubular extension is prevented from moving into the first tubular portion, so that the wire harness can easily be flexed with the first tubular portion.

Further, the internal diameters of the tubular extension and first tubular portion can be made smaller than the external diameter of the wire harness, so that the wire harness is tightly held over a longer distance by these two portions, thereby improving water-sealing properties.

Further, when funnel ribs are formed on the conical face of the funnel-shaped portion, they reduce the force required for inserting the grommet. These funnel ribs also serve for retaining the grommet in the through-hole.

In the above construction, the electrical cables forming a wire harness can be adhered with a water-trapping agent at the production line, before the grommet is inserted. Operational logistics can thus be improved.

The water-trapping agent can also be injected around the electrical cables contained in the tubular extension, once the wire harness has been passed through the grommet.

Further, the tubular extension can be reinforced with anti rip-off ribs which prevent the tubular extension from turning up or tearing up, and secure a tight grip on the wire harness therein. The anti tear-off ribs are preferably linked to the funnel-shaped portion, so that the latter is rendered less prone to deformations. As a result, the external face of that portion and the external circular groove are also prevented from deforming, and the grommet can hold the body panel more firmly.

The grommets known in the prior art have a length-to-diameter ratio L:D of 1:1 in normal cases, and 1:2 at the smallest (see FIG. 3A for the measurements of lengths L and D). Hence, the known funnel-shaped portion has an axially elongate size, and an excessively long part is protruded from the body panel into the wiring compartment. Indeed, the funnel-shaped portion requires a certain strength for maintaining the grommet in the body panel on the one hand, whilst it must be flexible enough to squeeze and pass through the through-hole of the body panel on the other. The grommet thus cannot be hard or rigid. In the past, the funnel-shaped portion was made flexible, whilst its strength was maintained by lengthening it.

The funnel-shaped portion can be provided with funnel ribs. In this way, when the grommet is mounted, only the funnel ribs of the funnel-shaped portion, and not the whole surface of the grommet, are placed into contact with the through-hole. The contact resistance is thus greatly reduced. Moreover, the recess areas formed between two adjacent funnel ribs can be squeezed and passed through the through-hole. As the funnel ribs give the funnel-shaped portion adequate strength once installed in the body panel, the funnel-shaped portion can be shortened to a proportion of L:D ranging from 1:5 to 1:3.

The above range is about half that of the grommets widely used in the prior art. The space required for the grommet is thus greatly reduced. As a result, when the wire harness is passed through the body panel and wired alongside it, it is no longer necessary to form a large loop with the harness, so economizing thus the wiring space.

In the above configuration, the solidified water-trapping zone is no longer contained in the tubular portion which extends from the funnel-shaped portion. The tubular portion thus can be flexed together with the wire harness exiting therefrom. In addition, as mentioned above, the part of the funnel-shaped portion projecting from the body panel is advantageously rendered as short as possible. Accordingly, the wire harness passed through the body panel can be flexed and wired even alongside the body panel, without losing any significant space.

The funnel ribs formed on the funnel-shaped portion serve to reduce the insertion force when the grommet is being installed in the through-hole. Moreover, the grommet is more securely held by the body panel once installed: when the wire harness is pulled outwardly, the end sections of the funnel ribs are abutted against the external face of the tubular portion and block the movement of the wire harness, thus preventing the peripheral rim of the through hole from floating off the external circular groove.

A link portion tying the funnel-shaped portion to the tubular portion may include a circular thin section, around which the tubular portion can be bent, independently from the funnel-shaped portion. Accordingly, even if the wire harness is bent at an acute angle, the accompanying tubular portion can follow this movement. The funnel-shaped portion, and the first groove wall section, thus can be protected from deformation, and the sealing between the grommet and the body panel is secured.

Such structure, as well as the extended tubular portion adapted to contain the solidified water-trapping zone and the specific configuration of the funnel-shaped portion, allows the wire harness to be flexed and wired near the body panel, thus increasing the flexibility and/or space availability for wiring the wire harness.

The grommet of the invention may include one or more auxiliary tube(s), and one end of each auxiliary tube is led out through the conical wall near the narrowed end of the funnel-shaped portion, whilst the other end thereof projects beyond the flared end of the funnel-shaped portion. As the auxiliary tube(s) is/are linked to the internal face of the funnel-shaped portion near the flared end section, they can be protected from bending even if they are relatively slender.

Further, the external circular face of the auxiliary tubes may be provided with reinforcing ribs arranged substantially parallel to each other in the circumferential direction and extending along the axial direction, such that the auxiliary tubes can be prevented from bending.

When both the link portion and the reinforcing ribs are provided on an auxiliary tube, the latter is strengthened both at the linked longitudinal direction and at the non-linked—but reinforced—longitudinal direction, so that bending of the tubes can be to all intents and purposes completely avoided.

When the bending of auxiliary tubes is avoided, the insertion operation for its hood wire or washer hose can be greatly improved. Further, when a grommet containing the aforementioned wire or hose is installed into the body panel, the hood wire/washer hose is less prone to bending. The washer hose thus ensures smooth water flow, and the hood release wire makes easier the opening and closing movements of the hood (bonnet).

The wire harness exiting from the funnel-shaped portion can be passed through a second tubular portion, and wrapped with a tape or adhesive at its exit point from the second tubular portion. The wire harness is thereby fixed with a tape or adhesive at its exit point from the first tubular portion, as well as from the second tubular portion. Accordingly, the grommet can easily be pulled off from both sides of the body panel, facilitating thus the grommet installation.

Further, as the auxiliary tube(s) is/are made to protrude through the apertures of the closing face, it/they abut(s) against the peripheral rim of the aperture(s), and are more securely prevented from folding.

When the internal diameter of the auxiliary tube(s) is the same as the external diameter of the hood wire or washer hose, this wire or hose will not be loose, but its passage into the tube will be difficult. Accordingly, each auxiliary tube is fitted, at given positions, with circular ribs which keep the openings slightly larger than the cable's diameter. These circular ribs reduce the play of the cable. Moreover, the circular ribs reinforce the tubes and help prevent them from bending.

The external conical face of the funnel-shaped portion can be provided with a plurality of ribs, radiating in all directions, from its narrowed end to its flared end, the ribs extending in the direction of flare. Preferably, the tips of the ribs at the narrowed end define a circular space with the first tubular portion. This circular space extends around the first tubular portion over the external face of the latter.

In such structure, when the grommet is inserted into the through hole of the body panel, only the outermost face of the ribs is placed into contact with the rim of the through hole. In this manner, the contact surface, and contact resistance, is reduced, and less pushing force is needed. As already mentioned, the end faces (tips) of the funnel ribs in this embodiment extend around the external face of the first tubular portion. As a result, when the wire harness is installed in the body panel hole with the grommet and submitted to a force tending to pull it off, the first tubular portion shifts towards the funnel-shaped portion. Then, the end faces of the funnel ribs abut against the external face of the first tubular portion and stop a further shift of the latter, so that the holding power of the grommet is greatly enhanced.

It will be understood from the foregoing that, depending on the optional embodiments, the grommet can have one or more of the following features including a flexible tubular portion, reduced axial length and/or a circular space formed around its tubular portion, so as to increase the flexibility and/or space availability for wiring; sealing with the through-hole which is not affected even if the wire harness used is flexed; and one or more auxiliary tube(s) for a hood wire and/or a washer hose.

BRIEF DESCRIPTION OF THE DRAWINGS

The above, and other objects, features and advantages of the present invention will be made apparent from the following description of the preferred embodiments, given as nonlimiting examples, with reference to the accompanying drawings in which:

FIG. 4 is a longitudinal cross-sectional view of the embodiment of FIG. 2, taken along line IV—IV of FIG. 2;

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1A:
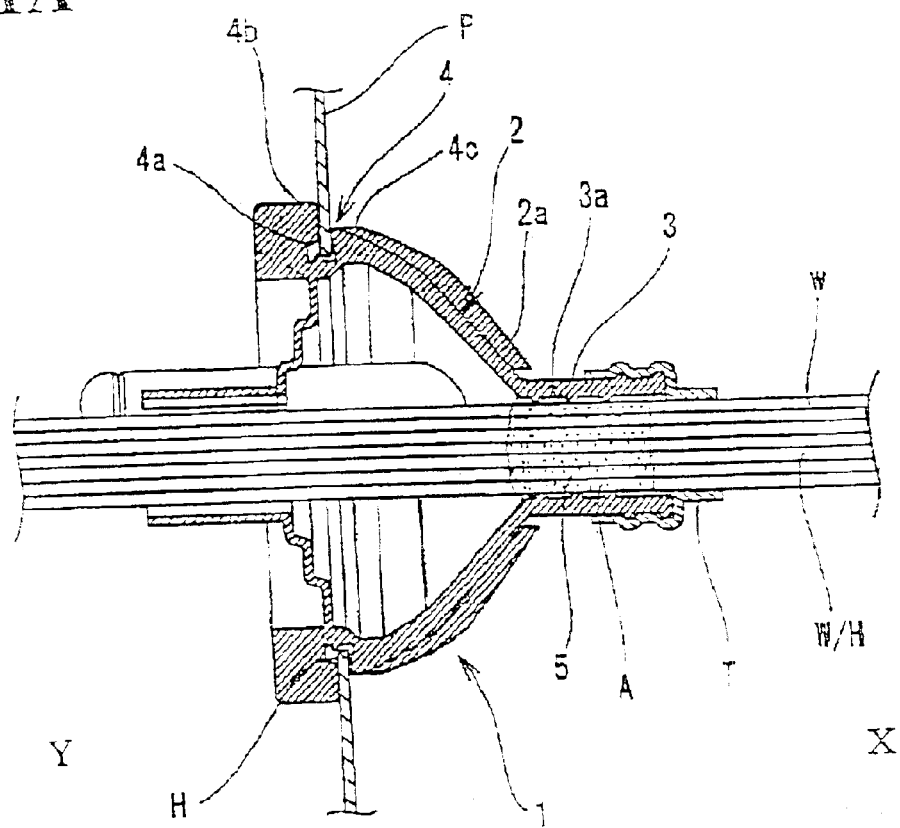
FIG. 1A is a longitudinal cross-sectional view of a prior art grommet.
Figure 1B:
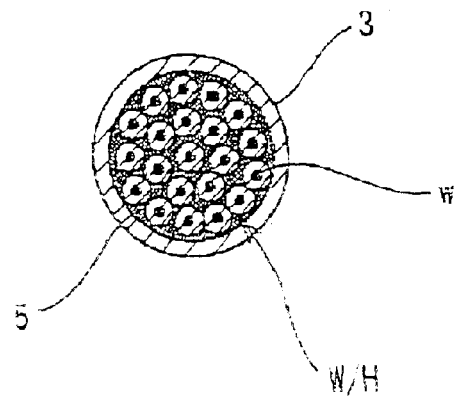
FIG. 1B is a cross-sectional view through the water-trapping zone in the tubular portion of the grommet of FIG. 1A.
Figure 1C:
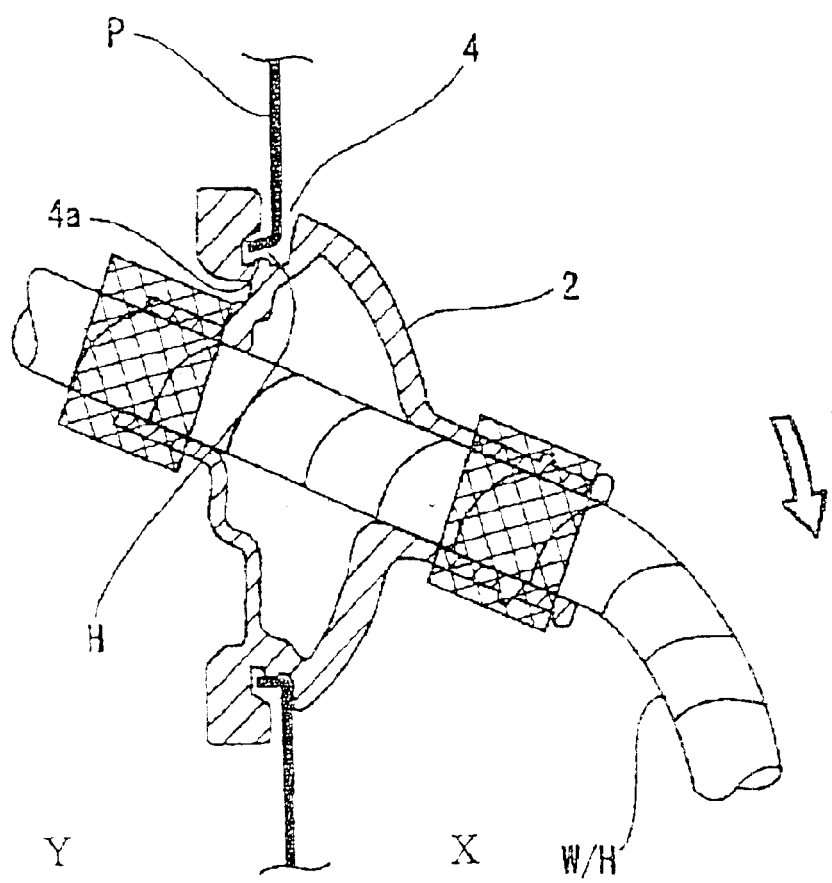
FIG. 1C schematically shows how the prior art grommet is deformed as the wire harness is wired alongside the body panel.
Figure 2:
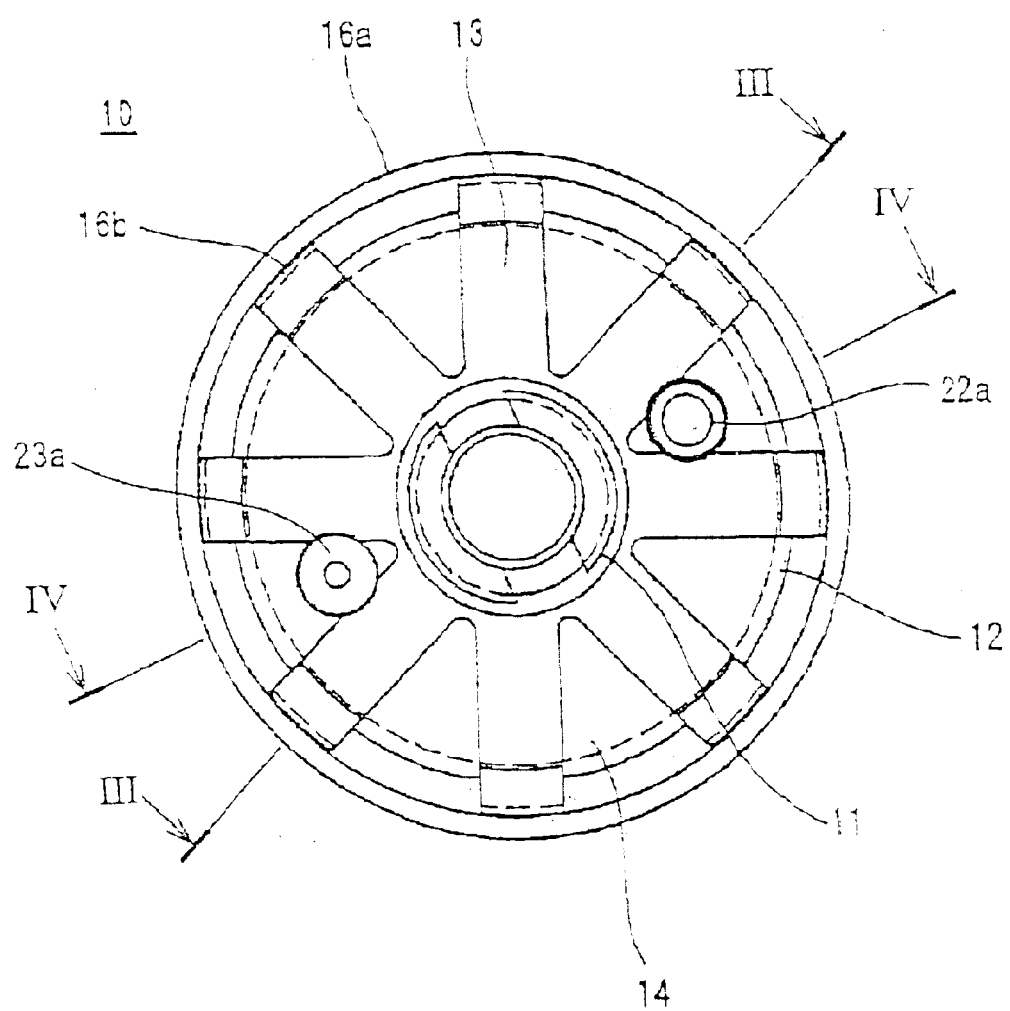
FIG. 2 is an end view of a grommet in accordance with an embodiment of the present invention, seen from the front of its tubular portion.
Figure 3A:
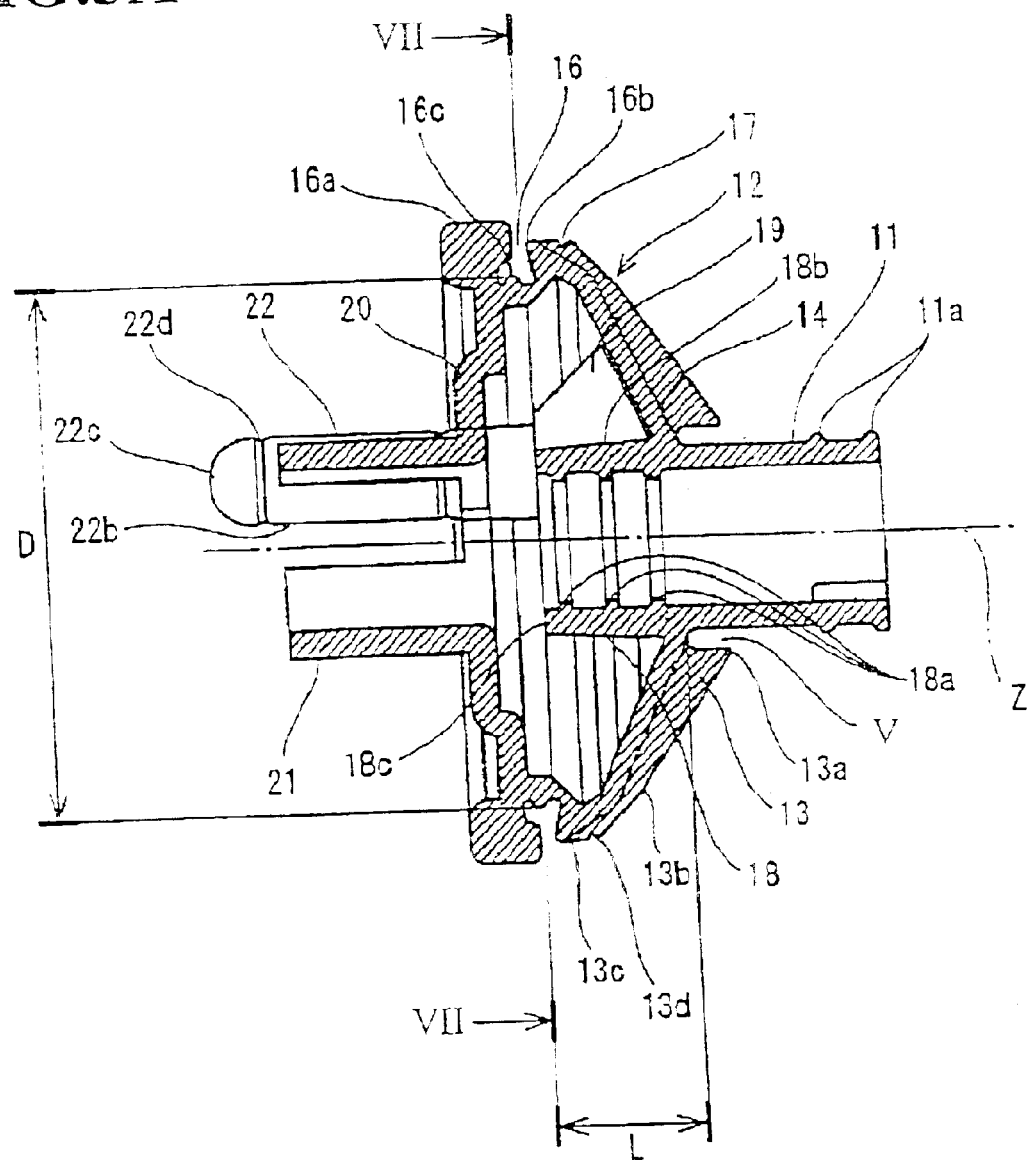
FIG. 3A is a longitudinal cross-sectional view of the embodiment of FIG. 2, indicating the length L and diameter D, taken along line III—III of FIG. 2.

As shown in FIGS. 2 and 3A, the grommet 10 according to a preferred embodiment may be formed unitarily and in a single piece. The grommet 10 may be constructed of any suitable material such as, for example, rubber or elastomer. The grommet 10 includes a funnel-shaped portion 12 which includes a conical face having a flared end of a relatively large diameter and a narrowed end, a first tubular portion 11 extending outwardly from the narrowed end, and a closing face 20 at the flared end. The closing face 20 is thin and has, for example, a communicating passage aligned substantially with a diameter line of the closing face. A second tubular portion 21 protrudes from a harness-receiving aperture formed at the central part of the communicating passage. An external circular groove 16 is provided near the flared end of the funnel-shaped portion 12.

A plurality of funnel ribs 13 are provided on the external conical surface of the funnel-shaped portion 12. The funnel ribs 13 radiate in all directions on the external conical face from the narrowed end and extend straight in alignment with the grommet's principle axis of symmetry Z, following the contour of the conical shape. An extended tubular portion 18 is provided inside the funnel-shaped portion 12. This extended tubular portion 18 is linked to and aligned with the first tubular portion 11.

The funnel-shaped portion 12 shown in FIG. 3A has a length L defined as a distance along axis Z, in the grommet's principle axis of revolution, between the center of the groove base 16c of the external circular groove 16 and the narrowed end of the funnel-shaped portion 12 where the funnel-shaped portion 12 joins the tubular portion 11. The funnel-shaped portion 12 has a diameter D defined as a diametrical distance in the plane normal to the axis Z, which plane includes the center of the external circular groove 16. Preferably, length L may be shortened to provide a ratio of L:D=1:4.

The extended tubular portion 18 includes an end section 18c which extends inside the funnel-shaped portion 12 to the level of the plane that includes the external circular groove 16 located near the flared end of the funnel-shaped portion 12. Further, the internal diameters of the extended tubular portion 18 and first tubular portion 11 are made smaller than the external diameter of the wire harness W/H to be used. Consequently, the wire harness W/H is tightly held. Moreover, there are provided parallel circular ribs 18a on the internal circular face of the extended tubular portion 18. The extended tubular portion 18 may include any suitable number of parallel circular ribs 18a, and in the present embodiment includes three parallel circular ribs 18a. These ribs 18a are arranged at a given interval in the direction of axis Z.

Figure 5:
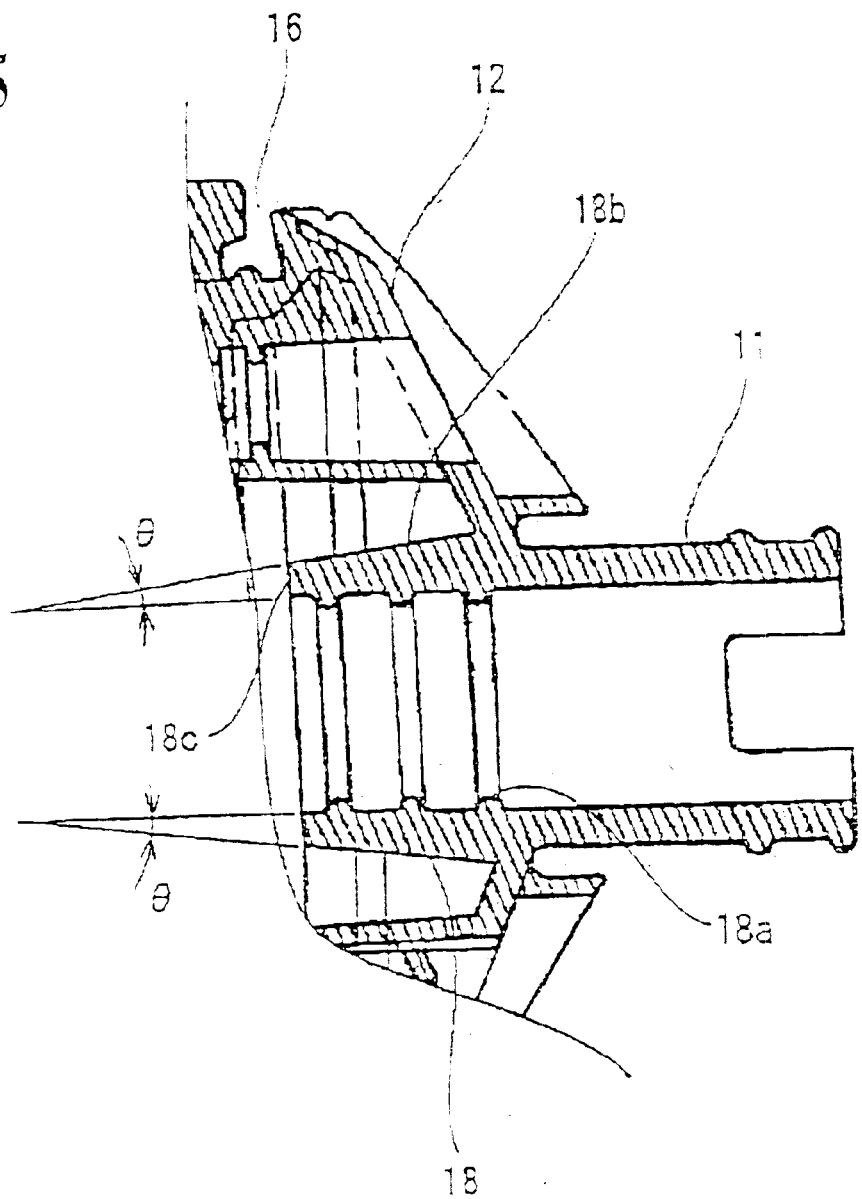
FIG. 5 is an enlarged longitudinal cross-sectional view of the extended tubular portion shown in FIG. 4.
Figure 7:
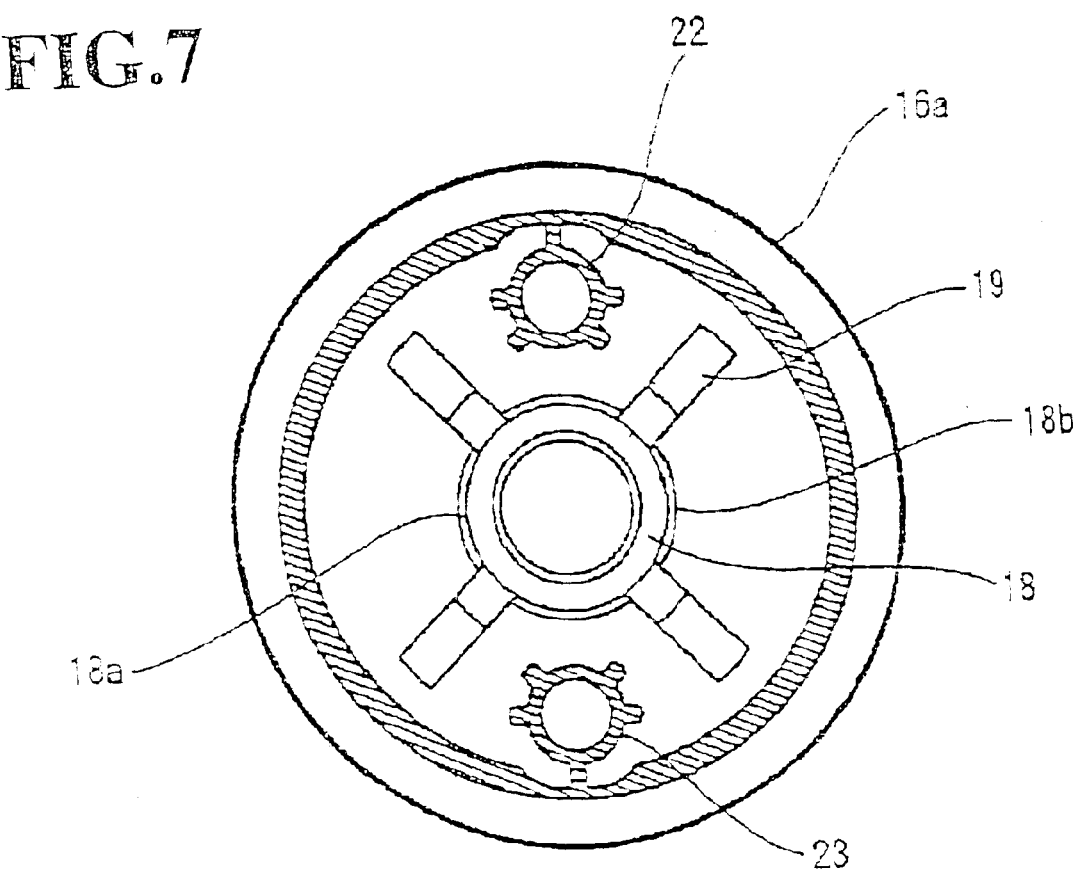
FIG. 7 is a cross-sectional view taken along line VII—VII of FIGS. 3A and 3B.
Figure 8:
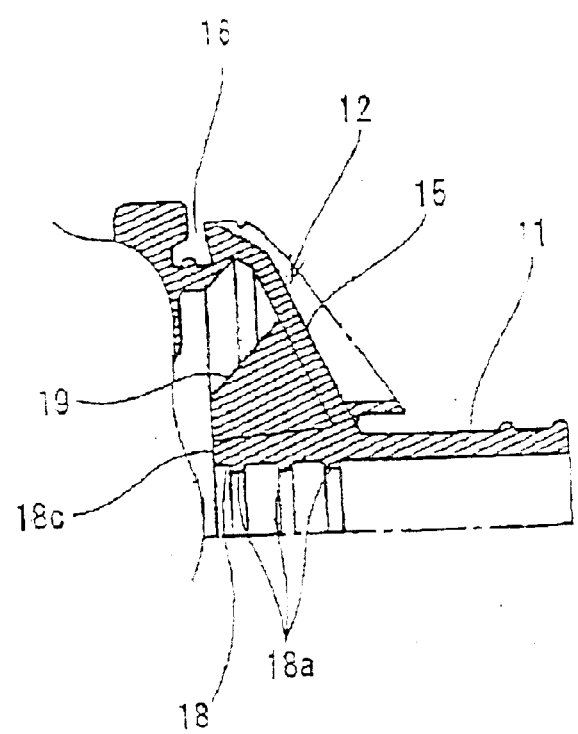
FIG. 8 is an enlarged longitudinal cross-sectional view of a portion of the funnel shaped portion, tubular portion and extended tubular portion of the embodiment of FIG. 2.
Figure 9:
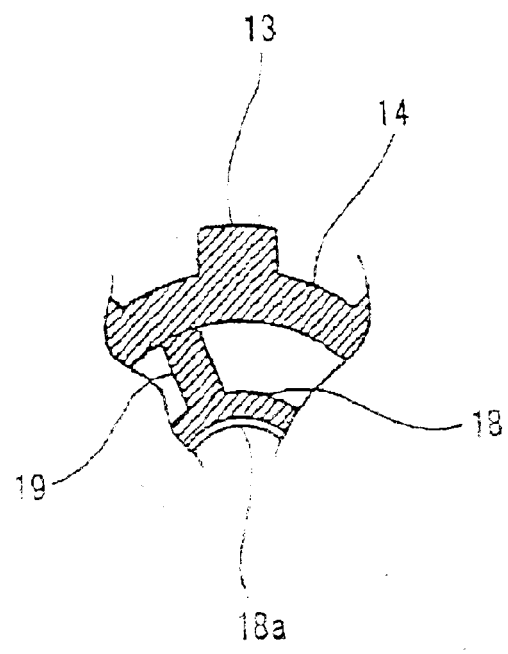
FIG. 9 is an enlarged cross-sectional view of part of the funnel-shaped portion and extended tubular portion.

Further, as shown in FIG. 5, the external face 18b of the tubular extension 18 is tapered, narrowing towards the end section 18c, so that its extrapolated angle is of θ degrees with respect to axis Z. Accordingly, the thickness of the cylindrical wall of the extended tubular portion 18 increases going from the end section 18c towards the joint section linking it to the first tubular portion 11. As shown in FIGS. 3A, 7 and 8, the external circular face of the extended tubular portion 18 includes anti-tear-off ribs 19 for preventing tearing off. The extended tubular portion 18 may include any suitable number of anti-tear-off ribs 19, and in the present embodiment, includes four anti-tear-off ribs 19. Further, the anti-tear-off ribs 19 may have, for example, a generally trapezoidal form. The ribs are arranged at regular angular intervals around the external circular face. These anti-tear-off ribs 19 extend from the circular face and join the internal face of the funnel-shaped portion 12.

Also, circular ribs 11a are provided on the external circular face of the first tubular portion 11 which projects from the funnel-shaped portion 12. The tubular portion 11 may include any suitable number of circular ribs 11a, and in the present embodiment, includes two circular ribs 11a. The annular end section of the tubular portion 11 includes slits 11b, as shown in FIG. 4. The annular end section of the tubular portion 11 may include two slits 11b diametrically opposed to each other.

Figure 10:
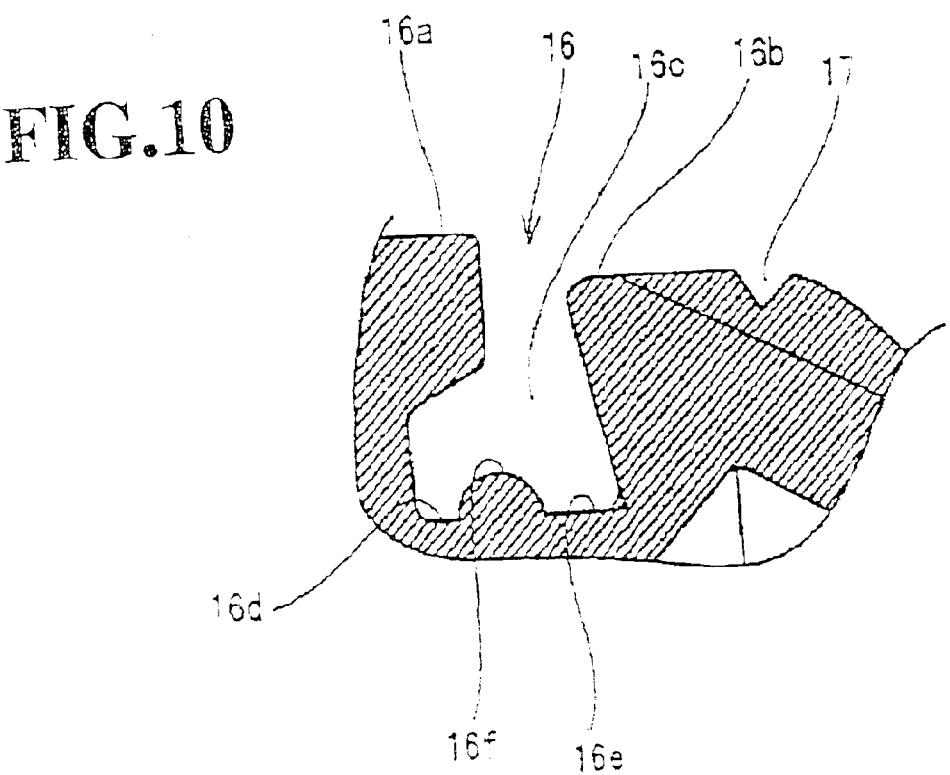
FIG. 10 is an enlarged longitudinal cross-sectional view of part of the external circular groove of the grommet shown in FIG. 8.

As shown in FIG. 10, the external circular groove 16 defines a first groove wall section 16a at the side of the groove nearest to the flared end and a second groove wall section 16b at the side of the groove wall nearest to the narrowed end. The first groove wall section 16a and the second groove wall section 16b face each other across the groove base 16c. Two groove base recesses 16d, 16e are defined by a groove base lip 16f on the groove base 16c.

The external conical face of the funnel-shaped portion 12 includes funnel ribs 13 radiating in all directions on the conical face from the narrowed end thereof. The external conical face of the funnel-shaped portion 12 may include any suitable number of funnel ribs 13, and in the present embodiment, includes eight funnel ribs 13. In other words, these funnel ribs 13 converge from the second groove wall section 16b towards the narrowed end linked to the first tubular portion 11, where they define a circular space V around the external face of the tubular portion 11.

Figure 12:
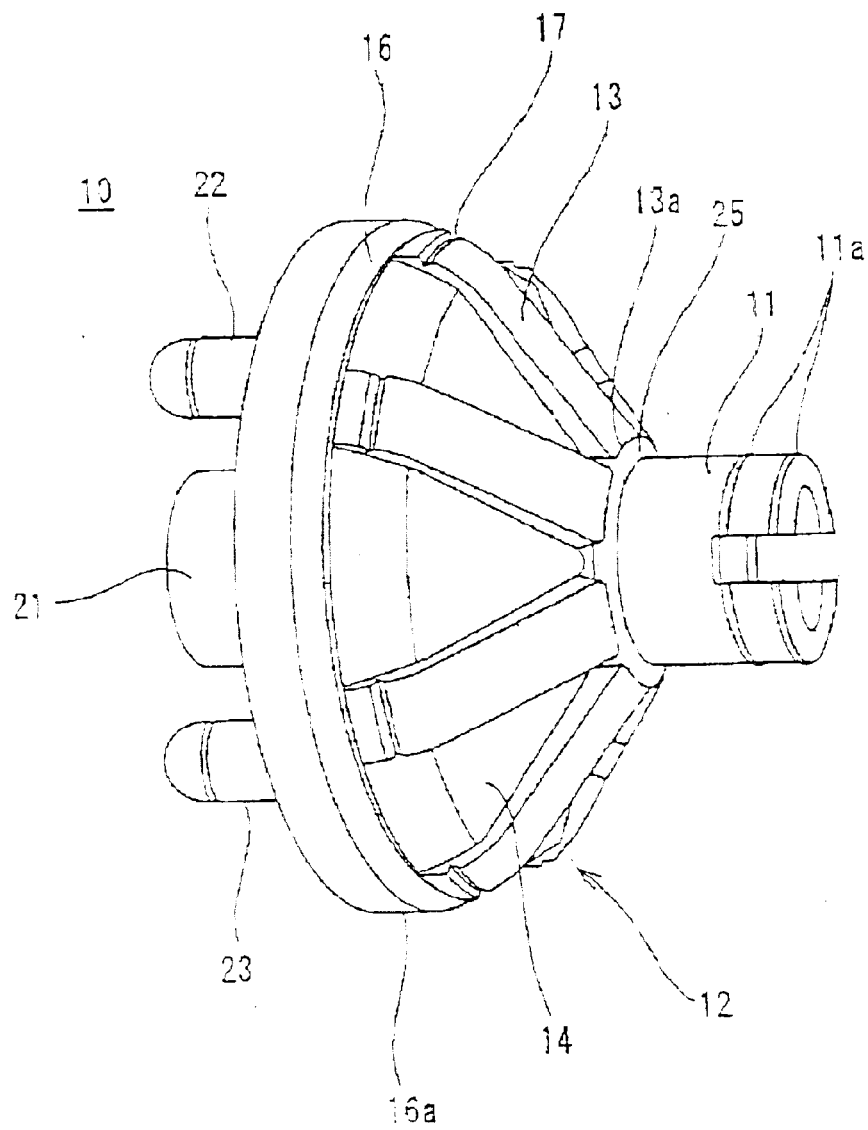
FIG. 12 is a perspective view of the embodiment of FIG. 2.
Figure 13:
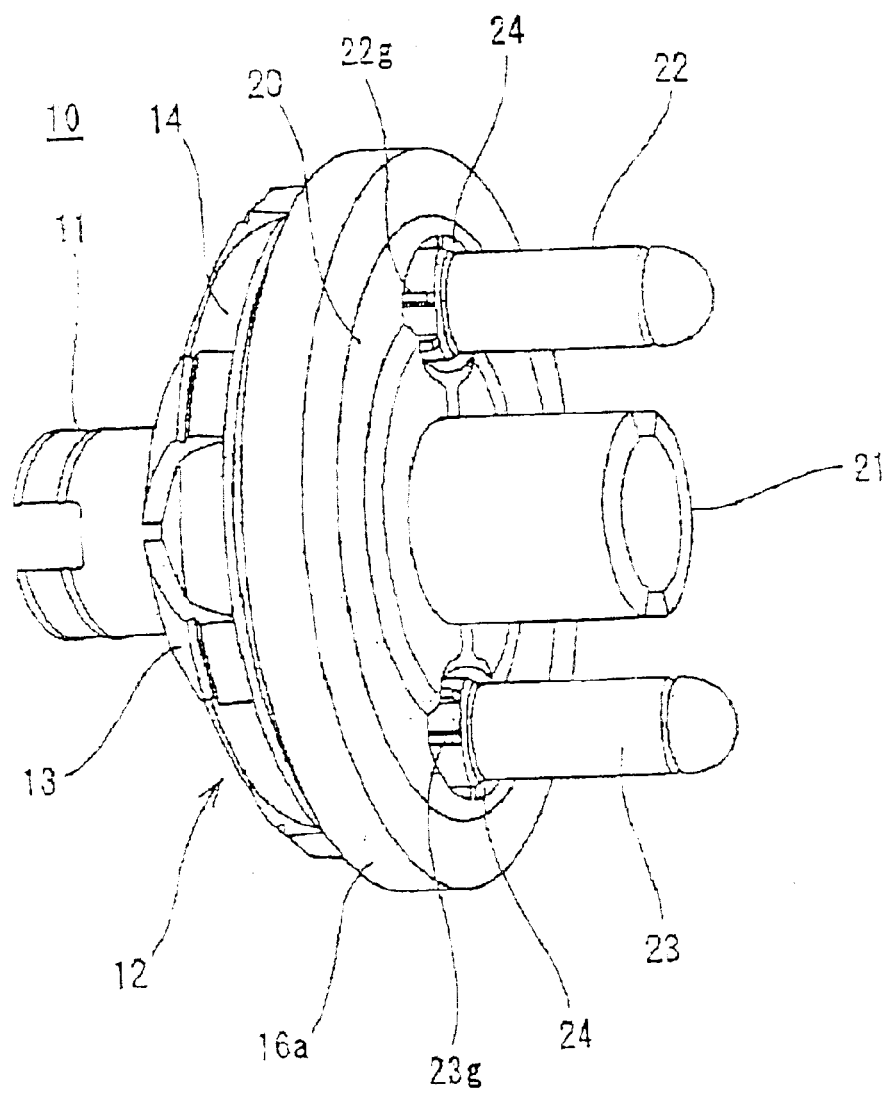
FIG. 13 is a perspective view of the embodiment of FIG. 2.

FIG. 2 shows that the funnel ribs 13 have the same width or thickness all along the length thereof, so that together they expand in the direction of the flare from the portion near the first tubular portion 11 to the second groove wall section 16b. Accordingly, as shown in FIG. 12, two adjacent funnel ribs 13 are located close together near the tubular portion 11 (see first end sections 13a in FIGS. 3A and 3B) and are located farther apart near the second groove wall section (see second end sections 13c in FIGS. 3A and 3B). Two adjacent funnel ribs 13 therefore define a triangular funnel recess 14 on the conical face of the funnel-shaped portion 12. Each of these funnel recesses 14 expands in surface from the narrowed end of the funnel-shaped portion 12 to the flared end thereof.

Further, the ends 13a of the funnel ribs 13 are configured so as to extend substantially parallel to axis Z of the first tubular portion 11 and form a space V with the external circular face thereof.

Figure 3B:
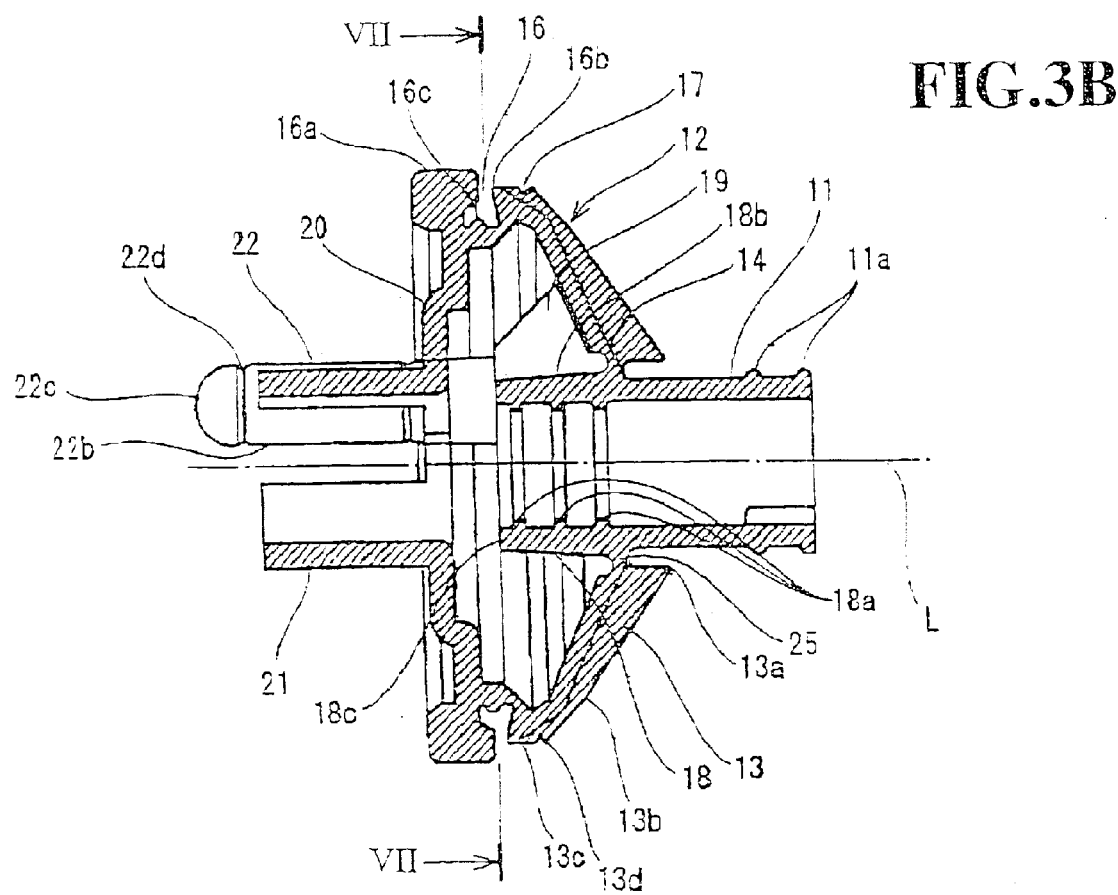
FIG. 3B is a longitudinal cross-sectional view of the embodiment of FIG. 2, showing the circular joint section, taken along line III—III of FIG. 2.
Figure 3C:
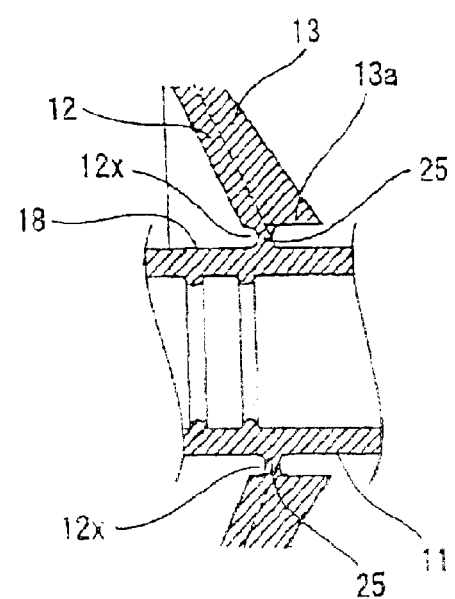
FIG. 3C is a partially enlarged view of the circular joint section of FIG. 3B.

As shown in FIGS. 3A and 3B, the radial projection of the funnel ribs 13 decreases gradually from their ends 13a to a first circular mark 13b, where the grommet 10 comes into contact with the peripheral rim of the through-hole H of a body panel P when mounted. The angle of inclination (with respect to axis Z) of the funnel ribs 13 is reduced from the first circular mark 13b to a second circular mark 13d, where the radial projection of the funnel ribs 13 attains that of the second groove wall section 16b. From the second circular mark 13d to the end section 13c, the funnel ribs 13 extend substantially parallel to axis Z of the funnel-shaped portion 12, thereby forming a circular plateau (for example, see FIG. 3A). As shown in FIG. 10, the circular plateau is provided with a peripheral notch 17 having a cross-section in the form of V, at a position adjacent the second circular mark 13d.

Figure 6:
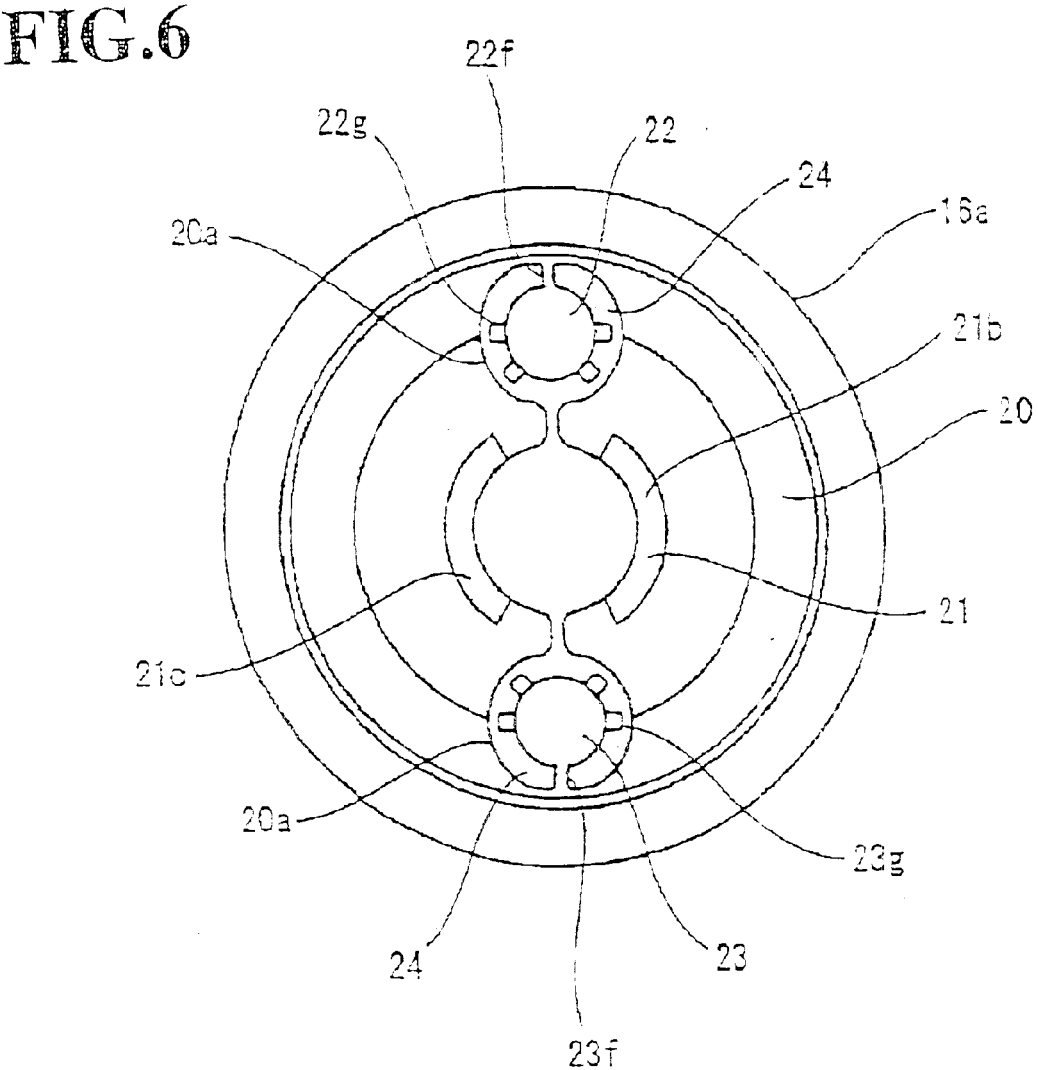
FIG. 6 is an end view of the embodiment of FIG. 2, seen from the front of the funnel-shaped portion.

As shown in FIG. 6, the flared end of the funnel-shaped portion 12 includes a closing face 20, which includes a harness-receiving aperture and, at diametrically opposed sides, a first auxiliary aperture and a second auxiliary aperture. These apertures are centered, for example, along a common diameter line that passes through the centers of the first and second auxiliary apertures, as well as the center of the harness receiving aperture at the intersection with axis Z. A second tubular portion 21 may be formed of arched channel members 21b, 21c flanking a portion of the circular contour of the harness-receiving aperture and projecting outwardly from the closing face 20. The second tubular portion may be formed of any suitable number of arched channel members, and in the present embodiment, includes two arched channel members 21, 21c.

The grommet 10 is integrally formed with an auxiliary tube 22 for a washer hose and an auxiliary tube 23 for a hood wire or cable. The grommet 120 may be formed unitarily and in one piece with the auxiliary tube 22 and the auxiliary tube 23.

First ends 22a and 23a of the auxiliary tubes 22 and 23 are led out through the funnel recess 14 of the funnel-shaped portion 12 (see FIG. 4), and second ends 22b, 23b of the auxiliary tubes 22, 23 extend outwardly through the closing face 20. The second ends 22b and 23b include closed portions 22c and 23c, which are cut off on lines 22d and 23d prior to use. As shown in FIG. 4, the internal circular face of one of the auxiliary tubes 22 is provided with, for example, two circular ribs 22e, and the internal circular face the other auxiliary tube 23 is provided with, for example, two circular ribs 23e which are inclined with respect to the grommet's radial cross-sectional plane and extend inwardly deeper than the circular ribs 22e of the one of the auxiliary tubes 22.

As shown in FIG. 6, the auxiliary tubes 22 and 23 pass through the auxiliary apertures 24 formed in the closing face 20. The external faces of each auxiliary tube 22 and 23 include longitudinal ribs, respectively 22g and 23g, arranged at a given pitch around the circumference of the tubes. The external faces of the auxiliary tubes 22, 23 may include any suitable number of longitudinal ribs, and in the present embodiment, each auxiliary tube 22, 23 includes four longitudinal ribs 22g, 23g, respectively. The auxiliary tubes 22 and 23 are bound to the peripheral rim 20a of the auxiliary apertures 24 and to the funnel-shaped portion 12 via link portions 22f and 23f.

The grommet 10 is fitted with a wire harness W/H in the following manner.

A wire harness W/H is formed of a bundle of electrical cables. These electrical cables are bundled on a production line, and adhered at a predetermined zone with, a water-trapping agent S. The wire harness W/H thus prepared is then inserted inside the grommet 10.

Figure 14A:
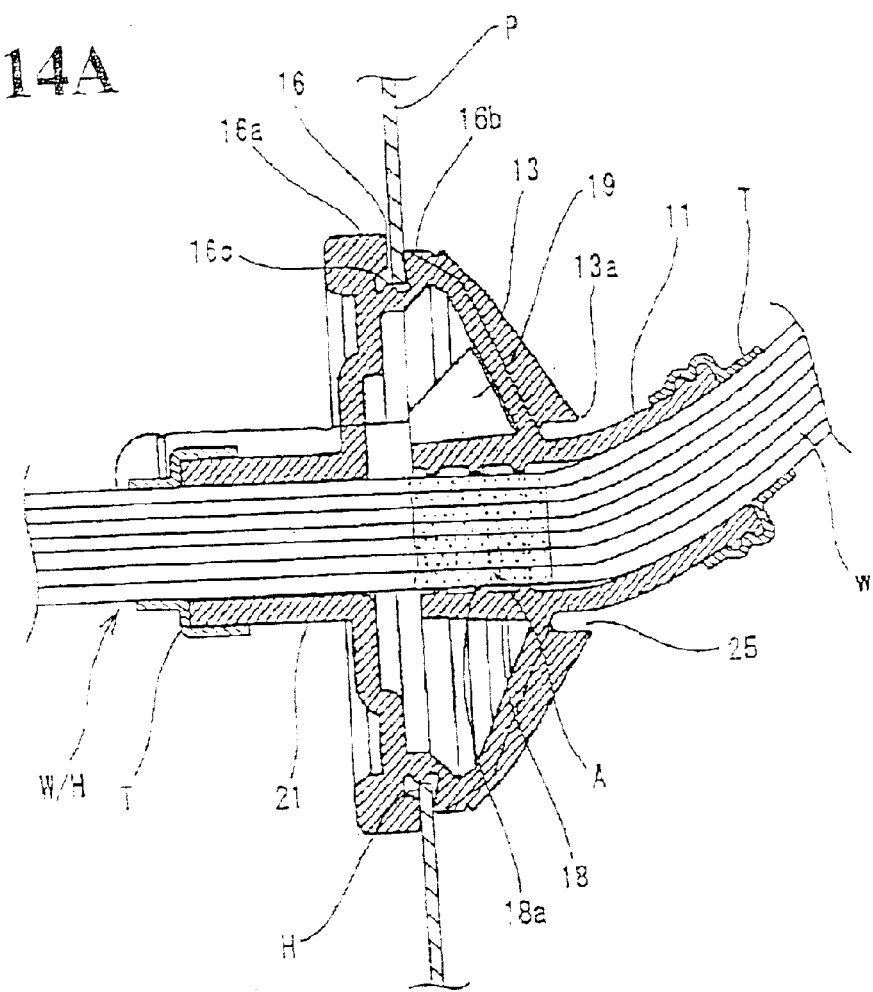
FIG. 14A is a longitudinal cross-sectional view of the embodiment of FIG. 2 and a wire harness installed in the car body panel.
Figure 14B:
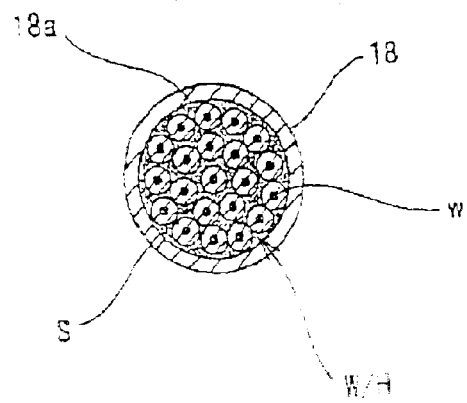
FIG. 14B is a cross-sectional view of the tubular extension containing a water-trapping zone shown in FIG. 14A.

As shown in FIGS. 14A and 14B, the predetermined zone is wrapped with a foamed sheet (not shown in the figures), to provide a water-trapping zone A. The wire harness W/H is then passed through the first tubular portion 11, extended tubular portion 18 and second tubular portion 21, such that the water-trapping zone A is contained in the extended tubular portion 18. The parts of the wire harness W/H positioned at the end of the tubular portion 11 and the second tubular portion 21 are wrapped and fixed with a respective tape portions T.

As the internal diameters of the tubular portion 11 and extended tubular portion 18 are designed to be smaller than the external diameter of the wire harness W/H, the latter, when inserted, presses these tubular portions in the enlarging direction and, in this manner, the wire harness W/H is firmly fixed in these tubular portions.

FIG. 14B shows the cross-section of the extended tubular portion 18 in the above-mentioned state, in which the internal circular ribs 18a of the extended tubular portion 18 are firmly fixed around the external circular face of the wire harness W/H. Such a construction, together with the use of water-trapping agents, further enhances the water-sealing effect.

The grommet 10 is mounted in the following manner. The tubular portion 11 of the grommet 10 is inserted from the engine compartment Y to the passenger compartment X via a through-hole H formed in the body panel P.

The funnel-shaped portion 12 of the grommet 10 is passed through the through-hole H, up to the first circular mark 13b of the funnel ribs 13. When the operator feels a first touch of contact between the funnel ribs 13 and the peripheral rim of the through-hole H, he/she pushes the grommet 10 further, so that the funnel ribs 13 are crushed/squeezed and pass through the hole H.

As the funnel recess 14 between the ribs 13 are flexed, the funnel-shaped portion 12 is smoothly shrunk. At the same time, as the inclination angle of the funnel ribs 13 is reduced, the grommet 10 can be inserted with just a small force.

When the outermost faces of the funnel ribs 13 advance through the through-hole H and come close to the second groove wall section 16b of the external circular groove 16, the peripheral rim of the hole H fits into the peripheral notch 17, and the operator feels a second touch of contact at a circular mark 13d. Starting therefrom, the outermost faces of the funnel ribs 13 extend parallel to axis Z of the grommet 10, so that the second groove wall section 16b is guided straight through the through-hole H. After the second touch of contact, the grommet 10 is simply pushed into the through-hole H, and the body panel P smoothly fits into the external circular groove 16.

As the outermost faces of the funnel ribs 13 are pressed down by the peripheral rim of the through-hole H and the funnel-shaped portion 12 is squeezed, the external circular face of the second groove wall section 16b passes through the through-hole H. Then, the funnel-shaped portion 12 is elastically restored to its initial size, the peripheral rim of the through-hole H fits into the external circular groove 16, and the second groove wall section 16b and the first groove wall section 16a clasp the body panel P at respective sides. Further, the peripheral rim of the through-hole H is clasped by the protrusion 16f, and the grommet 10 is hermetically held in the through-hole H. In this manner, the grommet 10 is mounted into the through-hole H of the body panel P by a single one-way motion.

Further, the tubular extension 18, which extends inside the funnel-shaped portion 12, encloses the water-trapping zone A of the wire harness W/H, where the water-trapping agent S is solidified. Thus, the water-trapping zone A is not located in the first tubular portion 11 that protrudes from the funnel-shaped portion 12 into the passenger compartment X. Accordingly, the wire harness W/H can be bent freely, together with the first tubular portion 11, in the passenger compartment X.

In a second embodiment of the invention, the axial length of the grommet 10 is reduced. Accordingly, the funnel-shaped portion 12 projects less into the passenger compartment X, and the tubular portion 11 atop is not away from the body panel P. The wire harness contained in the tubular portion 11 can thus be wired readily alongside the body panel P.

The wire harness thus acquires a greater freedom for wiring in the passenger compartment.

The external circular face of the tubular extension 18 is tapered from the portion linking to the tubular portion 11 towards the end section 18c of the extended tubular portion 18. In other words, the tightening force of the extended tubular portion 18 increases towards the tubular portion 11 along axis Z. This prevents the water-trapping zone from moving towards the tubular portion 11. For instance, a water-trapping agent S, e.g. silicone, is painted around the respective electrical cables of the wire harness, forming thus a water-trapping zone in about 20 to 30 seconds. When these electrical cables are passed through the grommet 10, it sometimes happens that the water-trapping zone is not sufficiently solidified. Even in such cases, the above tightening force prevents the water-trapping agent S from flowing into the first tubular portion 11. Thus, the latter can be kept flexible, while the wire harness W/H is flexed for wiring.

Further, by virtue of the axial variation of the tightening force, the water-trapping agent S contained in the water-trapping zone retains a good degree of fluidity, so that the agent can be dispersed uniformly among the electrical cables.

The tubular extension 18 is further reinforced by anti tear-off ribs 19 having, for example, a generally trapezoidal form. These ribs prevent the tubular extension 18 from being turned up or torn and, also provide a secure fitting of the wire harness therein. The anti tear-off ribs 19 are also joined to the funnel-shaped portion 12, so that, even if the installed wire harness W/H is forcibly pulled, the funnel-shaped portion 12 will be only minimally deformed, and the external circular groove 16 is prevented from being moved off the peripheral rim of the through-hole H.

Further, the circular space V provided between the first tubular portion 11 and the end sections 13a of the funnel ribs 13 prevents interference between these portions. This in turn allows the wire harness W/H and tubular portion 11 to be bent easily and together. Thus, when the wire harness W/H is folded for wiring, the tubular portion 11 can also be bent.

By virtue of this structure, deformations of the grommet, should they occur, are prevented from reaching the fitting zone between the external circular groove 16 and the body panel P.

Since the internal diameters of the tubular portion 11 and tubular extension 18 are smaller than the external diameter of the wire harness W/H, the wire harness W/H is tightly held in both the tubular portion 11 and the extended tubular portion 18, so that water sealing is further improved.

Moreover, the internal face of the extended tubular portion 18 is provided with a plurality of circular ribs 18a, which firmly hold the wire harness W/H and further enhance water-sealing capacities.

The funnel ribs 13 formed on the external conical face of the funnel-shaped portion 12 reduce the necessary insertion force and improve inserting operations. Also, the end sections of the funnel ribs 13 extend around the external face of the tubular portion 11. Hence, when the wire harness W/H is pulled towards the engine compartment, these end sections are abutted against the external face of the tubular portion 11, thereby securely preventing the wire harness W/H from moving and the grommet 10 from drifting off the through-hole H.

In a third embodiment, the end sections 13a of the funnel ribs 13 are inclined so as to form the circular space V around the first tubular portion 11 and, in the side sectional view, these end sections 13a extend parallel to axis Z of the tubular portion over its external face.

Further, an internal circular recess 12X is formed in the inner face of the funnel-shaped portion 12, at a position opposing the circular space V. The funnel-shaped portion 12 thus forms a circular joint section 25, at its narrowed end, which joins the funnel-shaped portion 12 to the tubular portion. The circular joint section 25 is made thin and is thus defined by the circular space V and the internal circular recess 12X.

By virtue of this configuration, the tubular portion 11 can be flexed easily against the funnel-shaped portion, and this flexion has no effect on the latter.

In other words, the tubular portion 11 can be flexed around the circular joint portion 25 independently from the funnel-shaped portion 12. Since the movement of the tubular portion thus has no effect on the funnel-shaped portion 12, the external circular groove portion 16 does not undergo any deformation either, and the sealing with the body panel can be kept intact.

Moreover, the circular joint section 25 allows the funnel-shaped portion to be squeezed easily, when the latter is passed through the through-hole. The circular joint section 25 thus forms an alternative or additional means to the radiating grooves in the funnel recesses 14 disclosed in the prior art.

In a fourth embodiment, the auxiliary tube 22 is used for passing a washer hose, and the auxiliary tube 23 is used for passing a hood (bonnet) wire. The letters "W" and "H", respectively designating the washer hose and the hood wire, may be embossed at the flared end of the funnel-shaped portion 12, so as to avoid path errors.

As already mentioned, the closing face 20 shutting the flared end of the funnel-shaped portion 12 is made of a thin film and opened at its central area (i.e. harness aperture). The second tubular portion 21 is made of two arched channel members 21b and 21c (thus forming open paths therebetween), which protrude through the harness aperture. An auxiliary aperture 24 is formed in extension of each of the open passages, and the auxiliary tubes 22 and 23 are passed through the respective auxiliary apertures 24. The end sections 22b and 23b of the auxiliary tubes 22 and 23 form closed ends 22c and 23c, which are cut off along cutting lines 22d and 23d when the cables are passed through.

Figure 11:
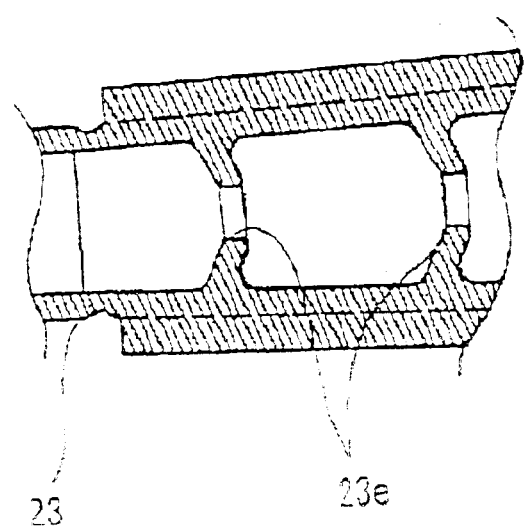
FIG. 11 is an enlarged longitudinal cross-sectional view of part of an auxiliary tube shown in FIG. 4.

Likewise, as shown in FIG. 4, the internal cylindrical face of the auxiliary tube 22 is provided with two circular ribs 22e for fitting a hose. The internal cylindrical face of the auxiliary tube 23 is provided with two circular ribs 23e (see FIG. 11), which are inclined with respect to axis Z and extend further toward the center of the auxiliary tube 23 than the circular ribs 22e extend toward the center of the auxiliary tube 22.

As shown in FIG. 6, each of the auxiliary tubes 22 and 23 is joined to the closing face 20 and the internal face of the funnel-shaped portion 12 through link portion 22f or 23f, respectively. Further, those parts of external cylindrical faces of the auxiliary tubes 22 and 23 which are outside the axis of the link portions 22f and 23f are provided with four longitudinal ribs 22g and 23g, respectively. They extend along the axial direction at a given interval taken in the circumferential direction. These link portions 22f and 23f and longitudinal ribs 22g and 23g prevent bending of the auxiliary tubes 22 and 23 that are usually long with a small diameter.

After the grommet 10 has been installed in the through-hole H, a hood wire and a washer hose are passed through the corresponding auxiliary tubes 23 and 22, respectively. As these auxiliary tubes 22 and 23 are bound via the link portion 22f and 23f to the funnel-shaped portion 12 and to the closing face 20, and further strengthened by the longitudinal ribs 22g and 23g, the hose- or wire-pass operation does not cause the auxiliary tubes 23 and 22 to be bent. Accordingly, a small-sized hood wire 50 and an easily bent washer hose 51 can be passed smoothly. Moreover, as the wire and hose are passed through a small opening formed by the internal circular ribs 22e and 23e, they are prevented from rattling inside.

The grommet 10 thus prevents the auxiliary tubes, prone to bending, from being folded. Further, the hood wire and the washer hose can be installed easily and, once installed, can be retained securely without folding.

As explained above, the water-trapping zone formed between the electrical cables (constituting a wire harness) is provided in the extended tubular portion which extends inside the funnel-shaped portion, but not in the tubular portion which extends outwardly from the funnel-shaped portion. Accordingly, the wire harness can easily be bent together with the tubular portion, and wiring flexibility is greatly improved.

In particular, the external face of the extended tubular portion is tapered from its end section to its section linked to the tubular portion, viewed along axis Z on the longitudinal section. Consequently, the gripping force of the extended tubular portion is stronger at its section linked to the tubular portion than at its end section. By virtue of this configuration, the water-trapping zone is prevented from shifting towards the tubular portion, and the latter can thus be flexed easily, while wiring.

In addition, anti tear-off ribs 19 are provided at a given interval around axis Z of the extended tubular portion 18, extending from the external cylindrical face of the extended tubular portion 18 to the internal face of the funnel-shaped portion. The extended tubular portion 18 is thus prevented from turning up, and the sealing of the wire harness is improved. Likewise, the external circular groove on the funnel-shaped portion is prevented from deforming, and the grommet can be held more firmly in the body panel.

The grommet can have a reduced length compared to prior art grommets, whereby the space taken up by the grommet can be reduced. Such a grommet is very useful when only a limited space is available. Further, when the wire harness has to be wired alongside the body panel P after passing the through-hole, this can be achieved without forming a large loop, owing to the compactly configured tubular portion.

Combined with the presence of a specifically-conceived extended tubular portion, the above structural configuration further improves the wiring flexibility and availability.

Moreover, as a circular space is formed between the end sections of the funnel ribs and the tubular portion, the tubular portion is prevented from interfering with the funnel ribs, as it happens when the wire harness together with the tubular portion are folded. Consequently, the tubular portion can be flexed easily with the wire harness, independently from the funnel-shaped portion.

As additional advantages of such a configuration, deformations of the grommet, should they occur, are prevented from reaching the zone where the through-hole of the body panel is fitted with the external circular groove, so that the flexion of the tubular portion does not damage the sealing between them.

As also clear from the forgoing, the circular joint portion 25 formed between the tubular portion 11 and the funnel ribs allows the tubular portion to flex around the circular joint portion 25, without causing deformations in the funnel-shaped portion 12. The external circular groove 16 formed on the funnel-shaped portion 12 thus undergo no deformation either, and the body panel is firmly sealed, so that water cannot penetrate into the passenger compartment.

Further, the extended tubular portion 11 can be flexed together with the wire harness W/H at an acute angle. This configuration, together with the reduced length of the tubular portion 11, increases the wiring flexibility in the passenger compartment.

Further, the end sections 13a of the funnel ribs 13 extend around and over the external face of the tubular portion 11. By virtue of this configuration, when the wire harness is pulled outwardly, the end sections 13a of the funnel ribs 13 abut against the external face of the tubular portion 11 and prevent its movement. The grommet 10 is thus further protected from moving off the through hole.

In another embodiment, when a hood wire and a washer hose are held in the grommet, the auxiliary tubes containing these wire and hose are prevented from folding by means of link portions and/or ribs. Thus, though the auxiliary tubes are small and long, the hood wire and the washer hose are easily installed in these tubes. Further, as the auxiliary tubes are reinforced to keep them straight, the installed hood wire and washer hose are prevented from bending. As a result, the washer hose ensures smooth water flow and the hood wire improves the opening and closing operations of the hood.

Although the invention has been described with reference to particular means, materials and embodiments, it is to be understood that the invention is not limited to the particulars disclosed and extends to all equivalents within the scope of the claims. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Application Nos. 2002-348718, 2002-348770, 2002-348806, 2002-348857 and 2002-348887, all filed on Nov. 29, 2002, which are herein expressly incorporated by reference in their entirety.

What is claimed is:

1. A grommet for mounting a vehicle wire harness which includes a water trapping zone, said grommet comprising:

a longitudinal axis;

a funnel shaped portion extending along said longitudinal axis and a tubular portion joined thereto by a circular joint section;

said funnel shaped portion having a generally conical wall with external and internal generally conical faces and a flared end, the external generally conical face comprising a plurality of funnel ribs and an external circular groove with a groove base;

wherein said external circular groove is engageable with a through-hole formed in a body panel of a vehicle; and wherein said funnel shaped portion comprises a device to improve flexibility of and/or space availability for the wire harness when mounted, including one of:

a structural configuration allowing the length of said grommet along said longitudinal axis of said funnel shaped portion to be reduced, such that the wire harness can be wired substantially alongside the body panel; and a circular space between said plurality of funnel ribs near said circular joint section and said tubular portion.

2. A grommet for mounting a vehicle wire harness which includes a water trapping zone, said grommet comprising:

a longitudinal axis;

a funnel shaped portion extending along said longitudinal axis and a tubular portion joined thereto by a circular joint section;

said funnel shaped portion having a generally conical wall with external and internal generally conical faces and a flared end, the external generally conical face comprising a plurality of funnel ribs and an external circular groove with a groove base;

wherein said external circular groove is engageable with a through-hole formed in a body panel of a vehicle; and wherein said funnel shaped portion comprises a device to improve flexibility of and/or space availability for the wire harness when mounted, including an extended tubular portion configured to hold the water trapping zone of the wire harness, wherein said extended tubular portion extends from said circular joint section toward the inside of said funnel shaped portion.

3. The grommet according to claim 2, wherein said extended tubular portion comprises a cylindrical wall and an end section distal from said circular joint section, and wherein the thickness of said cylindrical wall of said extended tubular portion increases from said end section to said circular joint section.

4. The grommet according to claim 2, wherein said tubular portion and said extended tubular portion have an internal diameter smaller than the external diameter of the wire harness to be mounted.

5. The grommet according to claim 2, wherein said extended tubular portion has an external cylindrical face which comprises anti-tear-off ribs extending along the longitudinal direction thereof and joined to said conical wall of said funnel-shaped portion.

6. The grommet according to claim 1, wherein said structural configuration has a length L along said longitudinal axis from said groove base of said funnel shaped portion to said circular joint section thereof, and a diameter D in a plane normal to said longitudinal axis and including said groove base, and wherein the ratio of L:D is in the range of approximately 1:5 to 1:3.

7. The grommet according to claim 6, wherein said ratio L:D is approximately 1:4.

8. The grommet according to claim 1, wherein said plurality of funnel ribs have first end sections adjacent said circular joint section and second end sections, and radiate in multiple directions from said first end sections on said external conical face of said funnel-shaped portion, and wherein said first end sections form a circular space around said tubular portion, such that said tubular portion can be flexed independently from said plurality of funnel ribs.

9. The grommet according to claim 8, wherein said circular joint section comprises a circular recess formed on a portion of said internal conical face of said funnel shaped portion which is opposed to said circular space.

10. The grommet according to claim 8, wherein said first end sections have a radial projection greater than a radial projection of said second end sections, and said first end sections, when viewed in a longitudinal sectional plane, extend substantially parallel to said longitudinal axis along said tubular portion.

11. The grommet according to claim 1, wherein said flared end of said funnel shaped portion comprises a closing face that includes a harness receiving aperture, from the rim of which a second tubular portion protrudes outwardly.

12. The grommet according to claim 11, wherein said second tubular portion is formed of two arched channels which extend from said closing face adjacent said harness receiving aperture.

13. The grommet according to claim 1, wherein said funnel-shaped portion contains at least one auxiliary tube extending along a line parallel to said longitudinal axis, and wherein a first end of said at least one auxiliary tube extends out through said conical wall of said funnel shaped portion, while a second end of said at least one auxiliary tube extends beyond said flared end of said funnel shaped portion.

14. The grommet according to claim 13, wherein said at least one auxiliary tube comprises a reinforcing device.

15. The grommet according to claim 14, wherein said at least one auxiliary tube comprises an external circular face, and said reinforcing device comprises at least one elongate link binding said external circular face of said at least one auxiliary tube to said conical wall of said funnel shaped portion.

16. The grommet according to claim 14, wherein said at least one auxiliary tube comprises an external circular face, and said reinforcing device comprises at least one longitudinal rib extending along a line spaced from said at least one elongate link.

17. The grommet according to claim 14, wherein said at least one auxiliary tube comprises an internal circular face, and said reinforcing device comprises at least one circular rib provided thereon.

18. The grommet according to claim 13, wherein said at least one auxiliary tube comprises a first auxiliary tube configured to receive a washer hose and a second auxiliary tube configured to receive a hood wire.

19. The grommet according to claim 13, wherein said flared end of said funnel shaped portion comprises a closing face that includes a first auxiliary aperture, a harness-receiving aperture and a second auxiliary aperture that are centrally aligned substantially along a common diameter line of said closing face and arranged in that order along said diameter line, and communicate with each other through an open passage, and wherein a second tubular portion extends outwardly from the rim of said harness-receiving aperture and said at least one auxiliary tube protrudes outwardly through said corresponding first and second auxiliary apertures.

20. The grommet according to claim 1, wherein said external circular groove defines a first groove wall section substantially in a plane normal to said longitudinal axis of said grommet, located at a groove side nearest to said flared end, and a second groove wall section inclined towards said flared end, located at a groove side closest to said narrowed end, whereby said funnel shaped portion is caused to be squeezed around said inclined wall when said grommet is passed through the through-hole.

21. The grommet according to claim 20, wherein said plurality of funnel ribs have first end sections adjacent said circular joint section and second end sections adjacent said second groove wall section, and radiate in multiple directions from said first end sections to said second end sections on said external conical face of said funnel shaped portion, and said funnel ribs comprise an outermost face having a radial projection which decreases substantially from said first end section to said second end section.

22. The grommet according to claim 20, wherein said funnel ribs have an outermost face which subtends a first angle relative to said longitudinal axis, from said first end section of said funnel ribs to a first mark where said grommet comes into contact with said peripheral rim of said through-hole when it is mounted, and said outermost face subtends a second angle which is smaller than said first angle, from said first mark to a second mark where said outermost face substantially extends to the level of the radial distance, perpendicular to said longitudinal axis, of said second groove wall section.

23. The grommet according to claim 22, wherein said outermost face extends substantially parallel to said longitudinal axis from said second mark to said second end portion of said funnel ribs.

24. The grommet according to claim 23, wherein said funnel shaped portion comprises a peripheral notch adjacent said second mark.

25. A wiring system including a grommet configured for mounting a vehicle wire harness which contains a water-trapping zone;
   said grommet comprising;
      a longitudinal axis;
      a funnel shaped portion and a tubular portion joined thereto by a circular joint section;
      said funnel shaped portion having a generally conical wall with external and internal generally conical faces and a flared end, the external generally conical face comprising a plurality of funnel ribs and an external circular groove with a groove base;
      wherein said external circular groove is engageable with a through-hole formed in a body panel of a vehicle; and
      wherein said funnel shaped portion comprises a device to improve flexibility of and/or space availability for the wire harness when mounted, including one of:
         a structural configuration allowing the length of said grommet along said longitudinal axis of the funnel shaped portion to be reduced, such that the wire harness can be wired substantially alongside the body panel; and
         a circular space between said plurality of funnel ribs near the circular joint section and said tubular portion;
   wherein the body panel is positioned between an engine compartment and a passenger compartment, said tubular portion of said grommet containing a wire harness is inserted from the engine compartment to the passenger compartment through the through-hole and the through-hole is fitted with said external circular groove, whereby said tubular portion extends inside the passenger compartment and can be bent together with the wire harness.

26. A wiring system including a grommet configured for mounting a vehicle wire harness which contains a water-trapping zone;

said grommet comprising;
a longitudinal axis;
a funnel shaped portion and a tubular portion joined thereto by a circular joint section;
said funnel shaped portion having a generally conical wall with external and internal generally conical faces and a flared end, the external generally conical face comprising a plurality of funnel ribs and an external circular groove with a groove base;
wherein said external circular groove is engageable with a through-hole formed in a body panel of a vehicle; and
wherein said funnel shaped portion comprises a device to improve flexibility of and/or space availability for the wire harness when mounted; including an extended tubular portion configured to hold the water trapping zone of the wire harness, wherein said extended tubular portion extends from said circular joint section toward the inside of said funnel shaped portion;
wherein the body panel is positioned between an engine compartment and a passenger compartment, said tubular portion of said grommet containing a wire harness is inserted from the engine compartment to the passenger compartment through the through-hole and the through-hole is fitted with said external circular groove, whereby said tubular portion extends inside the passenger compartment and can be bent together with the wire harness.

27. The wiring system according to claim 25, wherein said structural configuration has a length L along said longitudinal axis from said groove base of said funnel shaped portion to said narrowed end thereof, and a diameter D in the plane normal to said longitudinal axis including said groove base, and the ratio of L:D is in the range of approximately 1:5 to 1:3.

28. The wiring system according to claim 25, wherein said plurality of funnel ribs have first end sections adjacent said circular joint section and second end sections and radiate in multiple directions from said first end sections on said external conical face of said funnel shaped portion, and wherein said first end sections form a circular space around said tubular portion, such that said tubular portion can be flexed independently from said plurality of funnel ribs.

29. The wiring system according to claim 25, wherein said flared end of said funnel shaped portion comprises a closing face that includes a harness receiving aperture from the rim of which a second tubular portion extends outwardly.

30. The wiring system according to claim 25, wherein said funnel shaped portion comprises at least one auxiliary tube extending along an axis parallel to said longitudinally axis, and a first end of said at least one auxiliary tube extends out through said conical wall of said funnel shaped portion, while a second end of said at least one auxiliary tube extends beyond said flared end of said funnel shaped portion.

31. The wiring system according to claim 25, wherein said external circular groove defines a first groove wall section substantially in a plane normal to said longitudinal axis of said grommet, located at a groove side nearest to said flared end, and a second groove wall section inclined toward said flared end, located at a groove side closest to said narrowed end, whereby said funnel shaped portion is caused to be squeezed around said inclined wall when said grommet is passed through the through-hole.

* * * * *